United States Patent
Just

(10) Patent No.: US 11,566,574 B2
(45) Date of Patent: Jan. 31, 2023

(54) PAVING MACHINE ENGINE IDLE TIME REDUCTION

(71) Applicant: Caterpillar Paving Products Inc., Brooklyn Park, MN (US)

(72) Inventor: Nathan K. Just, Edina, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 481 days.

(21) Appl. No.: 16/841,117

(22) Filed: Apr. 6, 2020

(65) Prior Publication Data
US 2021/0310432 A1 Oct. 7, 2021

(51) Int. Cl.
*F02D 41/06* (2006.01)
*E01C 19/48* (2006.01)
*F02D 41/04* (2006.01)

(52) U.S. Cl.
CPC ........ *F02D 41/065* (2013.01); *E01C 19/4873* (2013.01); *F02D 41/042* (2013.01); *E01C 2301/00* (2013.01); *E01C 2301/10* (2013.01)

(58) Field of Classification Search
CPC .. F02D 41/042; F02D 41/065; F02D 2200/70; E01C 19/4873; E01C 19/48; E01C 2301/00; E01C 2301/10; G06Q 10/06313; G08G 1/202
USPC ........... 123/179.3, 179.4; 701/112, 113, 117, 701/32.3, 32.5, 465, 302
See application file for complete search history.

(56) References Cited

U.S. PATENT DOCUMENTS

| | | |
|---|---|---|
| 8,517,628 B2 | 8/2013 | Weiser et al. |
| 8,930,092 B2 | 1/2015 | Minich |
| 10,144,390 B1 | 12/2018 | Chaston et al. |
| 10,474,338 B2 | 11/2019 | Marsolek |
| 2013/0290062 A1 | 10/2013 | Patel et al. |
| 2017/0083844 A1 | 3/2017 | Baker et al. |

FOREIGN PATENT DOCUMENTS

KR 20190081703 7/2019

*Primary Examiner* — Hai H Huynh
(74) *Attorney, Agent, or Firm* — Schwegman, Lundberg & Woessner

(57) ABSTRACT

A system and method includes a paving machine, a vehicle, and one or more controllers. The paving machine includes an engine for powering the paving machine and the vehicle is associated with the paving machine. The one or more controllers are configured to determine an estimated time of arrival for the vehicle at the paving machine based on a location of the vehicle; identify a startup time for the paving machine, wherein the startup time comprises a time period between starting the engine of the paving machine and an operational parameter of the paving machine reaching a threshold value; and generate an indication to shut down the engine of the paving machine if the startup time for the paving machine is less than the estimated time of arrival of the vehicle associated with the paving machine.

20 Claims, 4 Drawing Sheets

PAVING MACHINE ENGINE IDLE TIME REDUCTION

TECHNICAL FIELD

The present application relates generally to paving machines. More particularly, the present application relates to reduction in engine idle time for paving machines.

BACKGROUND

Work machines, such as paving machines, are often utilized in conjunction with other work machines and/or vehicles. For example, a paving machine may receive asphalt from a haul track that has carried the asphalt from an asphalt plant to the paving machine. In ideal situations, the haul truck arrives at the paving machine when the paving machine requires further material. However, certain factors such as traffic and other real-world conditions can cause delays in arrival time of haul trucks to paving machines.

U.S. Pat. No. 10,474,338 B2 describes a system for tracking various machines related to paving operations, including haul trucks and paving machines.

SUMMARY

In one example, a method for reducing engine idle time for a paving machine operating at a worksite includes receiving an estimated time to arrival for a vehicle associated with the paving machine; identifying a startup time for the paving machine, wherein the startup time comprises a time period between starting an engine of the paving machine and an operational parameter of the paving machine reaching a threshold value; and shutting down the engine of the paving machine if the startup time for the paving machine is less than the estimated time to arrival for the vehicle associated with the paving machine.

In another example, a system includes a paving machine, a vehicle, and one or more controllers. The paving machine includes an engine for powering the paving machine and the vehicle is associated with the paving machine. The one or more controllers are configured to determine an estimated time of arrival for the vehicle at the paving machine based on a location of the vehicle; identify a startup time for the paving machine, wherein the startup time comprises a time period between starting the engine of the paving machine and an operational parameter of the paving machine reaching a threshold value; and generate an indication to shut down the engine of the paving machine if the startup time for the paving machine is less than the estimated time of arrival of the vehicle associated with the paving machine.

In another example, a method for controlling an engine of a paving machine includes receiving a location of a haul truck carrying paving material for the paving machine; determining an arrival time for the haul truck to arrive at the paving machine; determining a startup time between starting an engine of the paving machine and an operational parameter of the paving machine reaching a threshold value; and shutting down the engine of the paving machine upon determination that the startup time is less than the arrival time.

DETAILED DESCRIPTION

Figure 1:
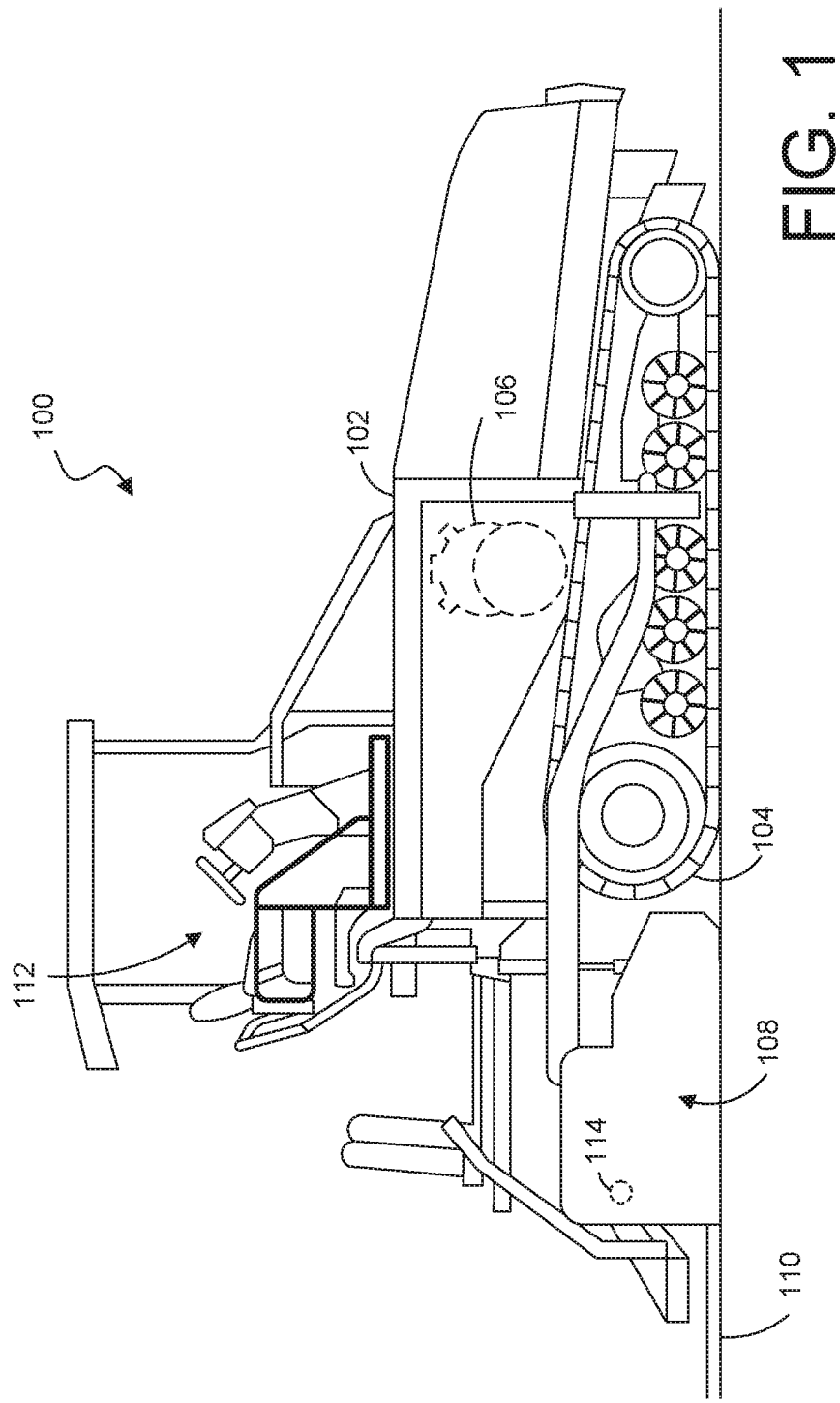
FIG. 1 is a diagram illustrating an example paving machine.

FIG. 1 is a diagram illustrating an example paving machine 100. The paving machine 100 generally includes a frame 102 with a set of ground-engaging elements 104 such as tracks or wheels coupled with the frame 102. The ground-engaging elements 104 may be driven by an engine 106 in a conventional manner. A screed assembly 108 can be positioned at the rear end of the paving machine 100 to spread and compact paving material into an asphalt mat 110 having a desired thickness, size, uniformity, crown profile and cross slope. The paving machine 100 also includes an operator station 112 having a seat and a console, which may include various controls for directing operations of the paving machine 100.

The screed assembly 108 may include one or more heating elements which may receive power from an electrical system of the paving machine 100. When starting the engine 106 of the paving machine 100, the heating elements of the screed assembly 108 may turn on and begin heating up. An operator of the paving machine may wait until the screed assembly 108 has reached a desired temperature prior to operating the paving machine 100 to spread and compact the paving material. A temperature sensor 114 may be positioned on or adjacent the screed assembly 108 to sense a temperature of the screed assembly 108.

The engine 106 may be an internal combustion engine, such as a diesel engine, or any other engine type used to power the paving machine 100. In some examples, engine lifetime may be based on total operating hours of the engine. Additionally, engine maintenance may be scheduled based on total operating hours. Thus, engine idling while not performing any paving operation can be detrimental to the lifetime of the engine 106 and may increase maintenance costs for the engine 106. Undesirable engine idling may also lead to unnecessary fuel consumption. One source of engine idling results from delay in arrival of paving material to a worksite of the paving machine 100. A haul truck carrying the paving material may be delayed due to traffic, issues at a plant location, or other reasons. In conventional operation, while a paving machine 100 waits for the arrival of paving material, the engine 106 often remains running. It is desirable to eliminate this idle time of the engine 106 to increase the lifetime of the engine 106, reduce maintenance costs of the engine 106, reduce fuel consumption, and/or reduce carbon footprint.

Figure 2:
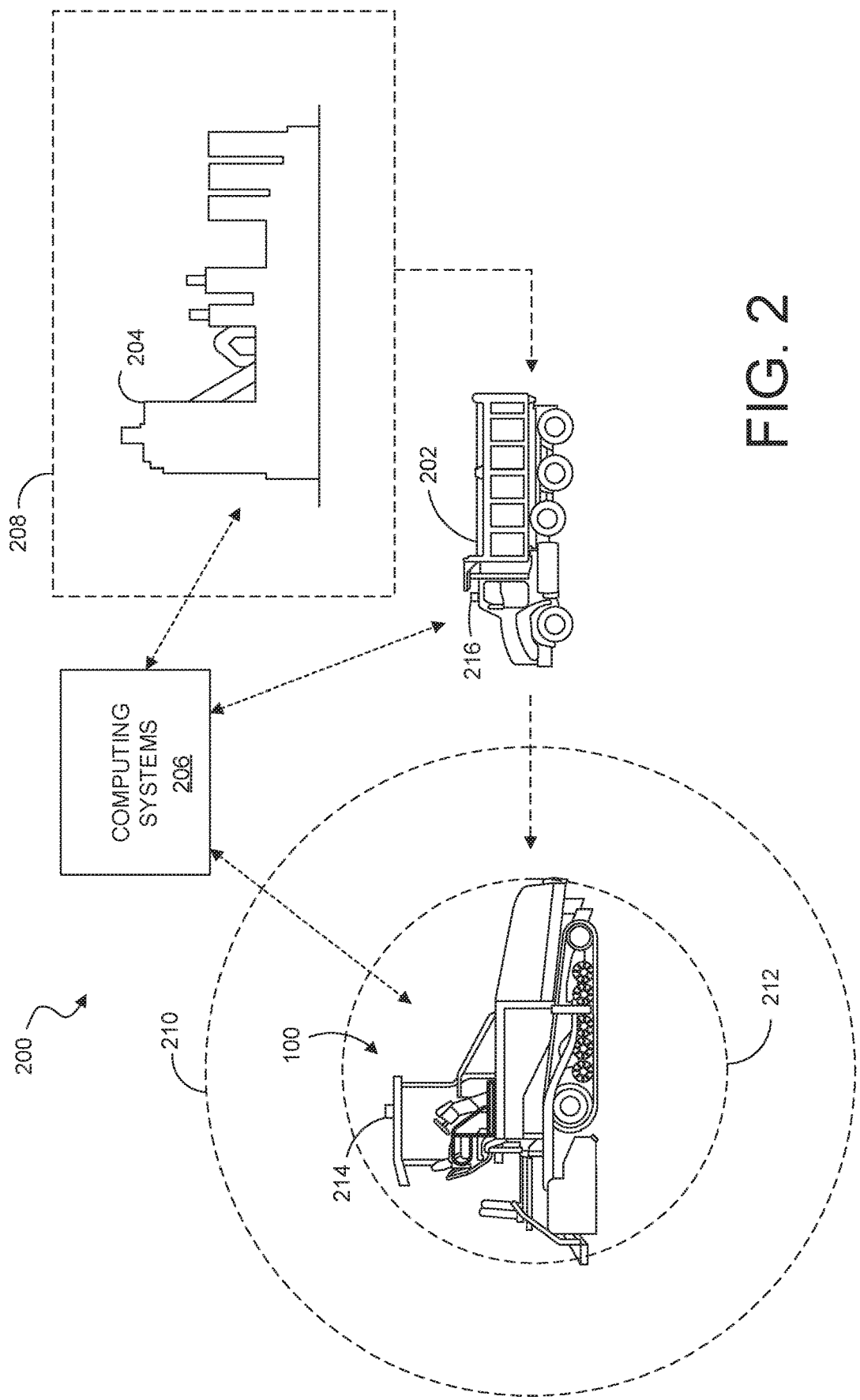
FIG. 2 is a diagram illustrating a haul track carrying paving material to a paving machine from a plant location.

FIG. 2 is a diagram illustrating a system 200 for tracking paving operations that may be used to reduce engine idle time of a paving machine 100. The system 200 may be configured to track a location of a haul truck 202 carrying paving material to a paving machine 100 from a plant location 204. The plant location 204 may be configured to produce asphalt or other paving material for use at a paving worksite. While FIG. 2 illustrates a single paving machine 100, a single haul truck 202, and a single plant location 204, paving operations may include several plant locations, several paving machines, and several haul trucks carrying paving materials to the worksite. Worksites may also include other machine types, including milling machines, compactors, and the like, which may also be tracked by the system 200.

One or more computing systems 206 may be configured to store data and/or execute software to track locations of the paving machine 100, the haul truck 202, and other aspects of the paving operation. The computing systems 206 may be located on the paving machine 100, on the haul truck 202, and/or on other computing systems remote from the paving machine 100 and haul truck 202 such as workstation computers, personal computers, servers, mobile computing devices, and the like.

To aid in tracking the paving operation, geofences 208, 210, and 212 may be used. In an example, the geofence 208 may define a geographic boundary for the plant location 204 inside of which the haul truck 202 is considered to be at the plant location 204. The geofence 210 may define a geographic area of a worksite, for example, or may define a first geographic boundary for the paving machine 100 such as within 400 meters of the paving machine 100. The geofence 212 may define a second geographic boundary for the paving machine 100 such as within 22 meters of the paving machine 100. The geofences 208, 210, and 212 may be used to determine when a haul truck 202 arrives at or leaves the plant location 204, and when the haul truck 202 arrives at the worksite and/or paving machine 100. The geofences may be defined by a plurality of coordinates, by a radius from a single geographic point, or using any other method.

The system 200 may also include locating devices 214 and 216 configured to identify two- or three-dimensional locations of the paving machine 100 and the haul truck 202, respectively. For example, the locations may be determined with respect to a global or local coordinate system. In an example, the locating devices 214 and 216 may be configured to receive location signals from a plurality of satellites associated with a global navigation satellite system (GNSS), such as Naystar Global Positioning System (GPS), GLONASS, Galileo, Beidou, and the like. Respective locating devices may use the positioning signals to determine its own position (e.g., by trilateration) with respect to the coordinate system, which may be used to determine the location of the paving machine 100 and the haul truck 202, respectively.

Using the locations of the paving machine 100 and the haul truck 202, an estimated time until the haul truck 202 is at the worksite and/or paving machine 100 may be determined. This may be an estimation of the time until the haul truck 202 reaches the geofences 210 or 212, for example. The estimated time may be based on a distance to the paving machine 100, a route of the haul truck 202, whether the haul truck is heading to, or coming from, the plant location 204, a current operational state of the plant location 204, current traffic for the planned route, prior travel times for the haul truck 202 and/or other haul trucks, and the like. The estimated time may be determined by the computing systems 206 or any other computing system that receives the locations of the haul truck 202 and the paving machine 100. In an example, a control system for the paving machine 100 may determine or receive the estimated time until the haul truck arrives at the paving machine 100 for use in controlling one or more aspects of the paving machine 100.

Figure 3:
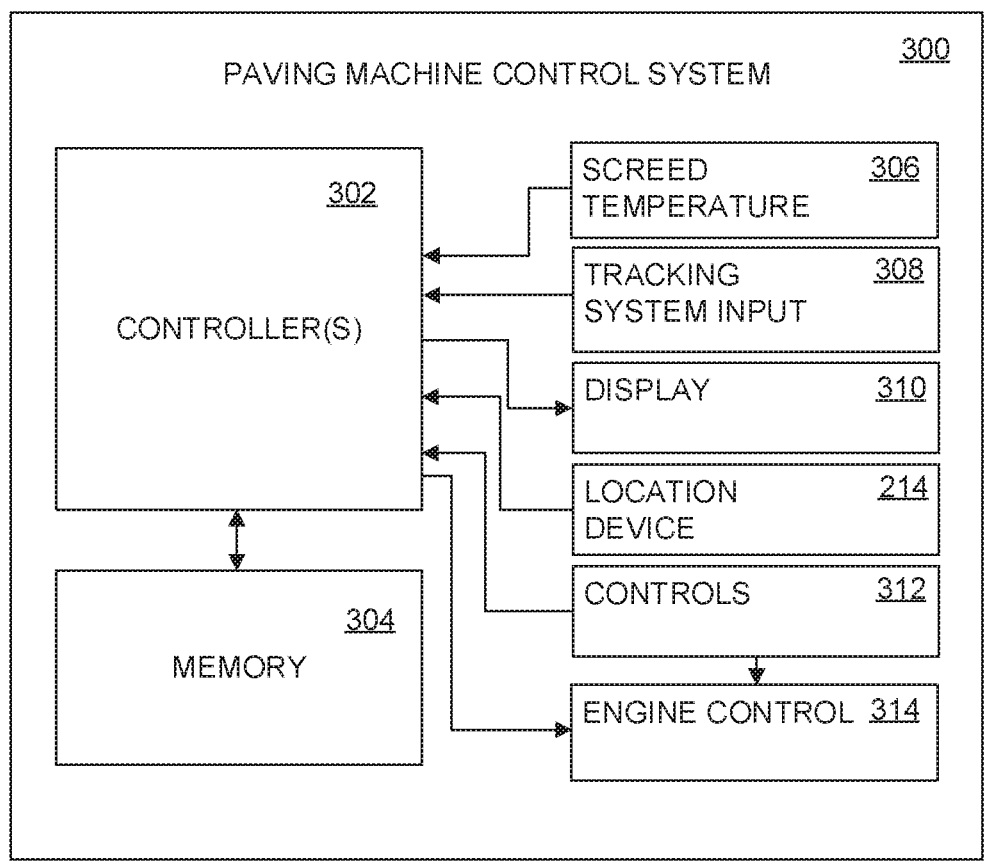
FIG. 3 is a block diagram illustrating a control system for a paving machine.

FIG. 3 is a block diagram illustrating a control system 300 for controlling the engine 106 to reduce engine idle time. The control system 300 includes one or more controllers 302, memory 304, screed temperature input 306, tracking system input 308, display 310, controls 312, and engine control 314. The controls 312 can be operated by an operator positioned at the operator control station 112, such as to control the operation of the paving machine 100, as well as the engine 106. The display 310 or other output device can also be positioned at the operator control station 112 to provide output to an operator. In an example, the controls 312 and the display 310 may be a single device, such as a touchscreen, for example. In an example, the controls 312 and the display 310 may be positioned remote from the paving machine 100 if the paving machine 100 is an automated paving machine.

The controller 302 and memory 304 can include, for example, software, hardware, and combinations of hardware and software configured to execute several functions related to control of the paving machine 100. The controller 302 can include an analog, digital, or combination analog and digital controller including a number of components. As examples, the controller 302 can include integrated circuit boards or ICB(s), printed circuit boards PCB(s), processor(s), data storage devices, switches, relays, or any other components. Examples of processors can include any one or more of a microprocessor, a controller, a digital signal processor (DSP), an application specific integrated circuit (ASIC), a field-programmable gate array (FPGA), or equivalent discrete or integrated logic circuitry.

The memory 304 may include storage media to store and/or retrieve data or other information such as, for example, locations of the paving machine 100 and/or the haul truck 202. The memory 304 may also store other information received from the tracking system input 308, which may receive data from the computing systems 206, for example. The tracking system input 308 may receive data from the computing systems 206 through one or more wireless transceivers or other network interfaces, for example. Storage devices, in some examples, are described as a computer-readable storage medium. The memory 304 can be used to store program instructions for execution by the controllers 302, for example. The memory 304, for example, is used by software, applications, algorithms, as examples, running on and/or executed by the controller 302. The memory 304 can include short-term and/or long-term memory and can be volatile and/or non-volatile. Examples of non-volatile storage elements include magnetic hard discs, optical discs, floppy discs, flash memories, or forms of electrically programmable memories (EPROM) or electrically erasable and programmable (EEPROM) memories. Examples of volatile memories include random access memories (RAM), dynamic random access memories (DRAM), static random access memories (SRAM), and other forms of volatile memories known in the art.

The controller 302 may be configured to determine the estimated time until the haul truck 202 arrives at the paving machine 100 and/or worksite based on a received location of the haul truck 202 received through the tracking system input 308 and the location device 214 of the paving machine 100, or may receive the estimated time until the haul truck 202 arrives at the paving machine through the tracking system input 308. The controller 302 may also be configured to identify a startup time for the paving machine 100. The startup time may be an estimated time between starting the engine 106 of the paving machine 100, and an operational parameter of the paving machine 100 reaching a desired value. For example, the operational parameter may be a temperature of the screed assembly 108. The estimated startup time may be based on prior operational data for the paving machine 100, lab tests, or any other method of identifying a time between starting the engine 106 and the operational parameter reaching a threshold value. The startup time may vary based on a present state of the operational parameter. For example, a current temperature of the screed may be received through the screed temperature input 306 from the temperature sensor 114, for example, and may be used to adjust the identified startup time. For example, if the current screed temperature is close to the threshold temperature, the startup time will be shorter.

The controller 302 may be configured to compare the estimated arrival time of the haul truck 202 to the identified startup time for the engine 106. If the identified startup time is less than the estimated arrival time, the engine 106 can be shut down. This reduces idle time of the engine 106, increasing the lifetime of the engine 106, reducing maintenance costs of the engine 106, reducing fuel consumption and/or reducing carbon footprint. The engine control 314 may be used to control the engine 106. For example, the engine control 314 may be used to start and shut down the engine 106. The engine control 314 may be operated by an operator positioned at the operator station 112 through the controls 312. For example, the operator may start the engine by inserting and turning a key or depressing an ignition button or switch to start the engine 106. In another example, the engine control 314 may be automatically operated by the controller 302 for automated paving machines. Thus, the engine 106 may be automatically shut down if the identified start time is less than the arrival time of the haul truck 202. For manually operated paving machines, an indicator may be output on the display 310 to inform an operator that the engine 106 may be shut down.

Once the engine 106 is shut down, the estimated arrival time can be monitored to determine when to restart the engine 106. The identified startup time can be updated based on the current temperature of the screed assembly 108 received from the screed temperature input 306. Once the estimated arrival time is less than or equal to the identified startup time of the paving machine 100, the engine 106 can be restarted so that screed temperature is at the desired temperature when the haul truck 202 arrives. This may be performed automatically by the controller 302 for automated paving machines. For manually operated paving machines, an indicator may be output to the display 310 to inform an operator of the paving machine 100 to restart the engine 106.

INDUSTRIAL APPLICABILITY

Figure 4:
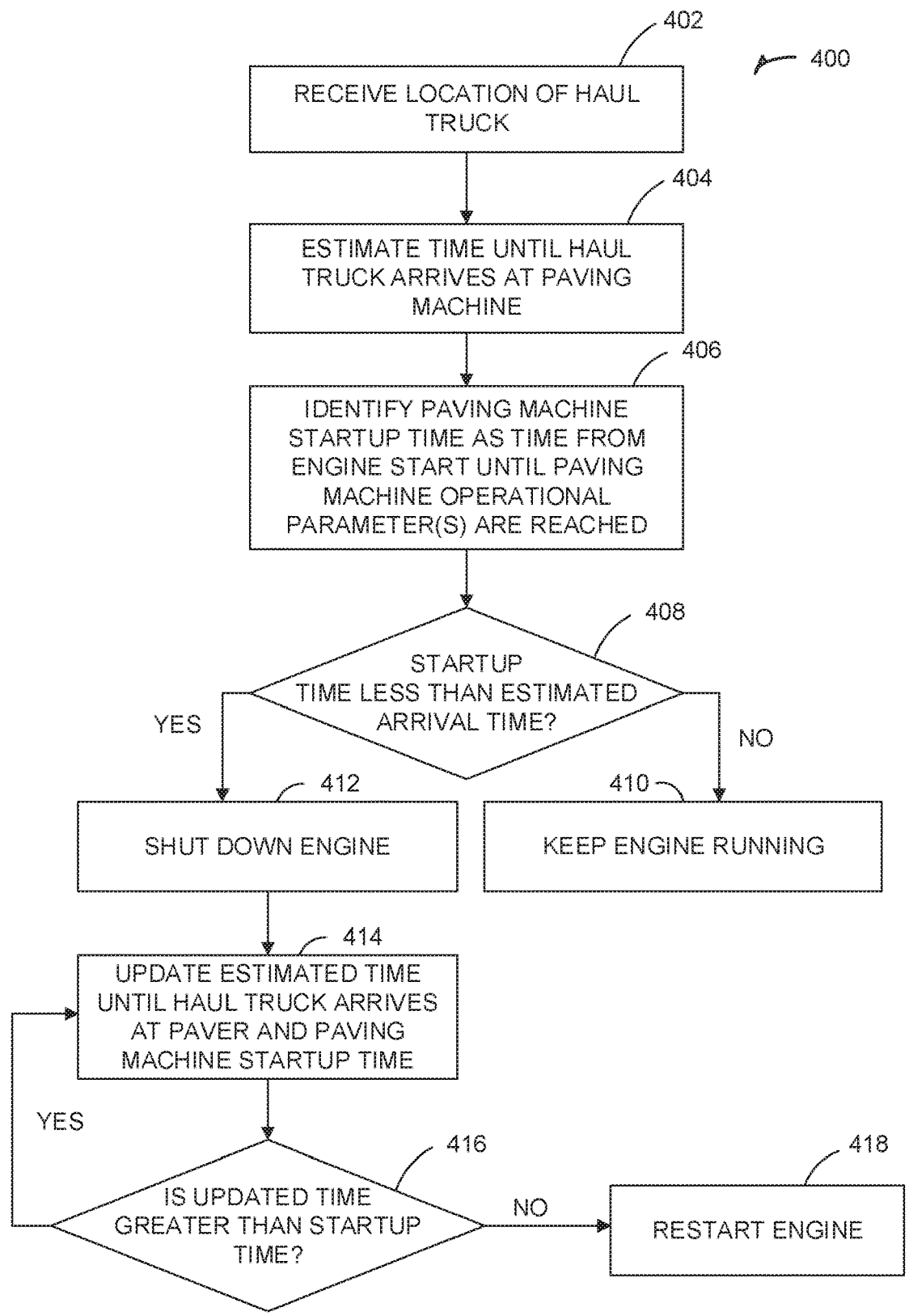
FIG. 4 is a flowchart illustrating a method for controlling a paving engine to reduce engine idle time.

In one illustrative example, a Caterpillar® eRoutes system may be used to track a paving operation that includes at least a paving machine and a haul truck. FIG. 4 is a method 400 of controlling a paving machine engine to reduce engine idle time. At step 402, a location of a haul truck is received. The haul track may be carrying paving material from a plant location to a paving work site. At step 404, an estimated time until the haul truck arrives at the paving machine may be estimated. This may be based on the current location of the haul truck, a planned route of the haul truck, current traffic patterns, prior trips of the haul truck, and the like. At step 406, a paving machine startup time may be identified. The paving machine startup time may be a time from starting the engine of the paving machine until an operational parameter of the paving machine is reached. For example, the operational parameter may be a temperature of a screed assembly of the paving machine. Thus, the startup time may be a time from starting the engine of the paver until the screed assembly warms up to a desired temperature.

At step 408, the estimated arrival time of the haul truck to the paving machine is compared to the identified startup time. If the identified startup time is less than or equal to the estimated arrival time, the method 400 proceeds to step 410 and the engine remains running. If the identified startup time is less than the estimated arrival time, the method 400 proceeds to step 412 and the engine of the paving machine is shut down. The engine may be shut down automatically, or by an operator of the paving machine. At step 414, following shutdown of the engine, the estimated arrival time of the haul truck is updated. The startup time of the paving machine may also be updated at step 414. For example, a current temperature of the screed assembly may be determined. The cooler the current screed temperature, the longer the startup time may be.

At step 416, the updated estimated arrival time of the haul truck to the paving machine is compared to the updated identified startup time. If the updated arrival time is greater than the updated identified startup time, the method 400 returns to step 414 and the engine remains off. If the updated arrival time is not greater than the updated identified startup time, the method 400 proceeds to step 418 and the engine of the paving machine is restarted.

Method 400 allows the engine of a paving machine to be shut down while waiting for paving material without adding any further delay to the paving operation, greatly reducing engine idle time. This increases the lifetime of the paving machine engine, reduces maintenance costs, increases resale value, reduces fuel consumption, and/or reduces carbon footprint.

The above detailed description is intended to be illustrative, and not restrictive. The scope of the disclosure should, therefore, be determined with references to the appended claims, along with the full scope of equivalents to which such claims are entitled.

What is claimed is:

1. A method for reducing engine idle time for a paving machine operating at a worksite, the method comprising:
   receiving an estimated time to arrival for a vehicle associated with the paving machine;
   identifying a startup time for the paving machine, wherein the startup time comprises a time period between starting an engine of the paving machine and an operational parameter of the paving machine reaching a threshold value; and
   shutting down the engine of the paving machine if the startup time for the paving machine is less than the estimated time to arrival for the vehicle associated with the paving machine.

2. The method of claim 1, wherein the paving machine comprises a screed assembly.

3. The method of claim 2, wherein identifying the startup time for the paving machine comprises estimating a time from starting the engine of the paving machine until a temperature of the screed assembly reaches a threshold temperature.

4. The method of claim 2, further comprising receiving an updated estimated time of arrival at the worksite for the vehicle associated with the paving machine.

5. The method of claim 4, further comprising receiving sensed data from a sensor positioned on the screed assembly.

6. The method of claim 5, further comprising determining an updated startup time for the paving machine using the sensed data.

7. The method of claim 6, further comprising re-starting the engine of the paving machine upon determination that the updated startup time for the paving machine is equal to or greater than the updated estimated time of arrival of the vehicle associated with the paving machine.

8. The method of claim 1, wherein the vehicle associated with the paving machine is a haul truck configured to carry paving material to the worksite.

9. A system comprising:
- a paving machine comprising an engine for powering the paving machine;
- a vehicle associated with the paving machine; and
- one or more controllers configured to:
  - determine an estimated time of arrival for the vehicle at the paving machine based on a location of the vehicle;
  - identify a startup time for the paving machine, wherein the startup time comprises a time period between starting the engine of the paving machine and an operational parameter of the paving machine reaching a threshold value; and
  - generate an indication to shut down the engine of the paving machine if the startup time for the paving machine is less than the estimated time of arrival of the vehicle associated with the paving machine.

10. The system of claim 9, wherein the paving machine further comprises a screed assembly, and wherein the vehicle associated with the paving machine is a haul truck configured to carry paving material.

11. The system of claim 10, wherein identifying the startup time for the paving machine comprises estimating a time from starting the engine of the paving machine until a temperature of the screed assembly reaches a threshold temperature.

12. The system of claim 10, wherein the one or more controllers are further configured to receive an updated estimated time of arrival for the haul truck when the engine is shutdown.

13. The system of claim 12, further comprising a screed sensor configured to sense a temperature of the screed assembly, and wherein the one or more controllers are further configured to receive sensed data from the screed sensor.

14. The system of claim 13, wherein the one or more controllers are further configured to determine an updated startup time for the paving machine using the sensed data.

15. The system of claim 14, wherein the one or more controllers are further configured to generate an indication to re-start the engine of the paving machine upon determination that the updated startup time for the paving machine is equal to or greater than the updated time of arrival of the vehicle associated with the paving machine.

16. A method for controlling an engine of a paving machine, the method comprising:
- receiving a location of a haul truck carrying paving material for the paving machine;
- determining an arrival time for the haul truck to arrive at the paving machine;
- determining a startup time between starting an engine of the paving machine and an operational parameter of the paving machine reaching a threshold value; and
- shutting down the engine of the paving machine upon determination that the startup time is less than the arrival time.

17. The method of claim 16, wherein the paving machine comprises a screed assembly, and wherein the operational parameter is a temperature of the screed assembly.

18. The method of claim 17, further comprising determining an updated estimated arrival time for the haul truck.

19. The method of claim 18, further comprising determining an updated startup time for the paving machine using a sensed temperature of the screed assembly.

20. The method of claim 19, further comprising re-starting the engine of the paving machine upon determination that the updated startup time for the paving machine is equal to or greater than the updated estimated arrival time of the haul truck.

* * * * *